2,758,101
WATER-SOLUBLE PHENOL-FORMALDEHYDE RESINS

Harold M. Shappell, Bound Brook, N. J., assignor to Union Carbide and Carbon Corporation, New York, N. Y.

No Drawing. Application March 13, 1952, Serial No. 276,440

4 Claims. (Cl. 260—29.3)

This invention relates to water-soluble, heat-hardenable condensation products of phenol and formaldehyde having particular utility in the bonding of mineral fibers, such as glass, rock wool and the like.

Glass and other inorganic fibers in the form of bats and like semi-compacted structures have found wide public acceptance in the fields of thermal and acoustical insulation. Such structures are generally dependent upon a resinous binder for permanently bonding the mineral fibers into a coherent structure. Presently water-soluble, heat-hardenable, phenol-aldehyde condensation products are preferred for this purpose due to their ease of application, and their desirable properties when heat-hardened such as water-resistance, adequate bond-strength, and thermal stability. These water-soluble condensation products are a complex mixture of phenol alcohols and related products, which upon further reaction first form water-insoluble viscous to solid resinous product, and these in turn upon further reaction, as by heating, convert into infusible and insoluble resins.

Depending upon the type of mineral wool structure desired, the resinous binder may constitute as little as 2 percent by weight of the total structure in the instance of a low density, relatively fluffy type bat, or as much as 20 percent by weight for high density bats having considerable resistance to deformation. Control of the binder content is generally obtained by diluting the water-soluble phenolaldehyde condensation product with one or more volumes of water; and then by immersion or by spraying technics applying such water solutions to a given volume of mineral fibers.

The mineral fibers are generally made by blowing a stream of molten glass or slag with high pressure steam in such manner that the stream is drawn into fibers of random lengths. The fibers while still hot from the drawing operation are then during transit in a forming hood or blow chamber sprayed with an aqueous solution of heat-hardenable phenol-aldehyde condensation product. Generally, there is sufficient residual heat in the mineral fibers to volatilize off substantially all the water from the condensation product, leaving the product on the fibers in a viscous or semi-resinous state, but which is virtually anhydrous. The resin coated fibers in web, mat or bat form is then usually transferred to a curing oven, where it is heated by blowing hot air, at temperatures of the order of 230–290° C. through the bat. These relatively high temperatures effect a curing of the condensation product to an infusible resin generally in less than seven minutes.

Due to these high curing temperatures a considerable portion of the potential resin solids in the condensation products are volatilized, in some instances amounting to 60 percent by weight of the resin which would have been obtained by curing at lower temperatures, such as 149° C., but with a longer curing time, for example, two hours. The volatilized resin portion cannot be readily recovered, and furthermore it is not appreciably soluble in water, thus precluding its reuse on mineral fibers. This loss of volatile resin components is of serious economic importance upon cognizance being taken of the fact that the glass and rock wool industry in the United States alone is presently consuming annually between about 15 to 20 million pounds of phenolic resin as a binder for mineral fibers.

In further explanation of what is meant by volatile resin loss, it should be understood that the water-soluble phenol-aldehyde condensation products are usually sold in the form of aqueous solutions containing some 40 to 70 percent by weight of potential infusible resin solids. The potential resin content is usually determined by drying for two hours in an oven having an air temperature of 149° C., a 10 gram sample of the aqueous condensation product diluted with 10 ml. of methyl alcohol. For convenience and reproducibility of test results, the alcohol diluted sample is placed in an open flat bottom container such as a 2 oz. capacity Gill style ointment box. Upon completion of the drying cycle, the condensation products are in an infusible solid form. During the drying cycle, in addition to removal of volatile matter such as water and unreacted phenol or formaldehyde, further condensation occurs of the phenolic condensation product or resin, and the water of condensation that is formed is also removed. The resin solids obtained under these conditions unfortunately do not truly represent the actual yield of infusible resin retained on the mineral fibers under the higher curing temperatures (230–290° C.) of the mineral fiber manufacturers. That is, in actual practice with water-soluble phenolic resins hitherto commercially available only a 30 to 60 percent yield of the potential solids as determined by the test at 149° C. will remain on the mineral fibers after curing.

Accordingly a major objective of the present invention is the production of water-soluble, heat-hardenable, condensation products of phenol and formaldehyde characterized by improved yields of resin solids under the heat-curing conditions presently employed by the mineral fiber industry.

It has now been found that water-soluble condensation products of phenol and formaldehyde characterized by a higher yield of resinous solids when cured at temperatures between 230° and 290° C. can be obtained by reacting phenol with formaldehyde at a reaction pH between 8.4 and 11.5 in the presence of an inorganic alkaline catalyst until at least 2.25 mols and up to three mols of formaldehyde have been reacted per mol of phenol to form a water-soluble condensation product, which on a purified basis, that is, free of catalyst, unreacted phenol and unreacted formaldehyde has an average molecular weight between 225 and 300 as determined by the Menzies-Wright boiling point method.

To readily obtain a water-soluble reaction product in which at least 2.25 mols of formaldehyde are reacted per mol of phenol, it has been found desirable that the reaction mixture contain per mol of phenol an excess of formaldehyde preferably at least 2.50 mols of formaldehyde which can be in aqueous solution such as formalin or as a polymer such as paraform. Preferably the reaction mixture contains three or more mols of formaldehyde per mol of phenol to promote the reaction leading to the combination of at least 2.25 mols formaldehyde per mol phenol.

As complete removal of unreacted formaldehyde is somewhat difficult to accomplish by distillation procedures, it is usually left in the product. In some instances the odor of the unreacted formaldehyde during curing of the product on mineral fibers may be objectionable to operating personnel. This problem can be alleviated by incorporating in the reaction product at the time of use a sufficient amount of ammonia, or primary and secondary amines such as monoethanolamine, diethyl amine and the like to chemically combine with the unreacted formaldehyde.

A sufficient amount of a strong inorganic, non-volatile, alkaline catalyst such as sodium hydroxide, barium hydroxide, calcium hydroxide or potassium hydroxide is added to the reaction mixture of phenol and formaldehyde to impart a pH value between 8.4 and 11.0 during the reaction. For this purpose, in the instance of sodium hydroxide between 3.0 parts and 42.5 parts thereof by weight can be used per 100 parts of phenol. Similarly, the chemical equivalents of the other aforementioned strong alkaline catalysts can be used in place of sodium hydroxide.

The amount of catalyst employed is a definite factor as regards high yields of resin solids at the curing temperatures employed by the mineral fiber industry. For example water-soluble reaction products prepared from a charged ratio of one mol phenol and three mols formaldehyde and with 3 parts of sodium hydroxide per 100 parts of phenol, as catalyst, when cured at 230–290° C. had about a 70 percent yield of the resin solids obtainable by curing at 149° C., with 4 parts of sodium hydroxide per 100 parts phenol a reaction product was obtained having a 76 percent yield of resin solids at fiber curing temperatures; and with 6 parts of sodium hydroxide per 100 parts phenol, an 80% yield of cured resin solids was noted.

The alkaline catalysts in amount to secure a reaction pH between 8.4 and 11.5 appear to direct the condensation reaction towards the formation of methylol groups ($CH_2OH$) and minimize formation of methylene (—$CH_2$—) linkages between the phenol molecules; the latter type structures are undesirable since they contribute to water insolubility of the product.

The reaction temperature should not exceed 80° C. and preferably is between 50° and 75° C. While the reaction at a pH between 8.4 and 11.5 takes place at temperatures as low as 25° C. in a period of 18 to 72 hours, it is preferred to use elevated temperatures to reduce production time. For example, at a reaction temperature of 70° C., the reaction usually proceeds to the desired end point in one to four hours.

To determine whether or not the reaction has proceeded far enough to yield a reaction product having an average molecular weight between 225 and 300 requires far more testing time than is feasible in commercial production. Additionally any test to determine the amount of unreacted formaldehyde, and by difference calculating the amount of reacted or combined formaldehyde cannot be performed quickly enough to be used as a manufacturing control, particularly when elevated reaction temperatures are employed. However, sufficient data with respect to any given reaction vessel or still, batch size and any particular reaction temperature can be obtained on the basis of one or two trial runs in which samples are periodically removed and subsequently examined for average molecular weight. The data thus obtained, indicates when the alkaline-catalyzed reaction should normally be terminated. Therefore, in regular production, a simple determination that the alkaline-catalyzed reaction product has infinite miscibility with distilled water serves adequately as a control measure to indicate that this intermediate reaction product can then be partially dehydrated and neutralized and yet retain a water miscibility of at least 500 percent with distilled water.

The intermediate reaction product is a thin aqueous solution containing water of condensation, water of solution if formalin has been used as the source of formaldehyde, and unreacted formaldehyde. At this point the reaction product is largely a mixture of monomethylol phenols, dimethylol phenols, some trimethylol phenols, and polymethylol diphenylols. Analysis of the product shows that an average of at least two mols of formaldehyde have reacted per mol phenol to form methylol, and some methylene ether groups. While the product at this state could be used to bond mineral fibers, the alkalinity of the product is injurious to mineral fibers. Furthermore, the product if retained at a pH above 8.4 until ready to be used by the mineral wool-manufacturer, and then neutralized, would have a much poorer solubility in water, than a product neutralized immediately after manufacture and stored for the same length of time prior to being used.

It has been found that partial neutralization of the alkaline catalyst in the reaction product is essential for the dual purpose of retaining water-miscibility (up to twenty days at summer temperatures and even longer at lower temperatures) and to eliminate alkaline attack of mineral fibers. For this purpose any water-soluble acid such as hydrochloric acid, sulphuric acid, phosphoric acid and oxalic acid can be used. By partial neutralization is meant reducing the pH value of the reaction product to a pH range between 7.3 and 7.8. A pH value lower than 7.3 is objectionable for the reason that the products rapidly lose water-miscibility on storage or shipment.

The salts formed in the partial neutralization step may be soluble or insoluble in the reaction product. For example, a sodium hydroxide catalyzed reaction when partially neutralized with hydrochloric acid yields sodium chloride which is soluble in the phenol-formaldehyde condensate, whereas a barium hydroxide catalyzed reaction which is neutralized with sulphuric acid yields insoluble barium sulfate, the latter type salt being removed by filtration or decantation.

Preferably the phenol-formaldehyde reaction products are partially dehydrated to reduce shipping costs. Complete dehydration is undesirable however, since such dehydrated products have excessively high viscosities and poor water-miscibility as the reactions tend to continue during dehydration. Dehydration to a solids content of up to about 70 percent by weight (determined by heating a sample for two hours at 149° C.) is practical and is best accomplished by vacuum distillation. The resultant partially dehydrated product at up to 70 percent solids has sufficient fluidity for cooling, filtering and pumping operations.

In partially dehydrating the water-soluble condensation products it has been found desirable to accomplish substantially all or at least a major part of the water removal prior to the step of partially neutralizing the alkaline catalyst in order to obtain water-miscible products yielding a high resin content when heat-converted. By dehydrating unneutralized reaction products at a pH value of at least 8.4 and preferably higher, a water-miscibility value of 500 percent and higher is retained, providing the reaction mass is not heated above about 50° C. during this step.

While not necessarily related to the yield of potential resin solids of a given water soluble phenol-formaldehyde condensation product, the degree of water miscibility is highly important in determining whether or not the material may be suitably diluted for proper application to the fibers and as a gauge of its probable useful storage life.

Water miscibility is determined as follows. To a 250 ml. graduate add 20 ml. of the material to be tested and which has been adjusted to a temperature of 25° C. Add distilled water in increments of 20 ml. and at a temperature of 25° C. Mix well after each addition of water and observe the clarity of the mixture. Continue the addition of the distilled water until a clouding or turbidity of the mixture appears and which does not disappear on thorough mixing. The number of such 20 ml. additions, made before the appearance of the persistent cloud or turbidity, times 100, is the percent miscibility of the material.

The following examples additionally illustrate the practice of the invention.

Example 1

A still equipped with an agitator, reflux and distillation column, and steam heating means was charged (all parts being by weight) with 100 parts of synthetic phenol, 287 parts formalin (37% formaldehyde content), and 25 parts of a 25% aqueous solution of sodium hydroxide. Heat was applied to the still to raise the temperature of the reaction mixture to about 40–45° C. and was then discontinued as an exothermic reaction was initiated. The temperature of the reaction mass was permitted to rise to 70° C., and then held at this point by vacuum refluxing for 1.25 hours. Vacuum distillation was then initiated, the temperature dropping below 50° C. 150 parts of distillate consisting of water and unreacted formaldehyde were collected. The partially dehydrated reaction product was then partially neutralized with 50 parts of a 10% aqueous solution of hydrochloric acid. Vacuum distillation at a temperature below 50° C. was reinitiated to remove as rapidly as possible the water added by the aqueous hydrochloric acid solution and to further dehydrate the product to yield 63 parts of distillate, principally water. The resultant product was an amber colored liquid having a viscosity of 400 centistokes at 25° C.; a water miscibility of at least 2000 percent; a pH value between 7.3 and 7.6 and a specific gravity between 1.2800 and 1.2900 at 25° C. The non-volatile or solids content was 64.0% as determined by drying a sample for two hours at 149° C. Analytical data, based on the charged molar ratio of one mol phenol and 3.329 mols formaldehyde indicated that 2.340 mols formaldehyde had reacted to form methylol and methylene groups; 0.752 mols of formaldehyde were present as free or unreacted material in the product, and 0.137 mols formaldehyde were accounted for in the distillate. The average molecular weight (Menzies-Wright) of the reaction product treated to remove unreacted formaldehyde, water, catalyst and salt was 240. When the reaction product was applied to glass fibers and baked at temperatures between 230° and 290° C. yields of 71 percent and higher of the potential resin solids recoverable on curing at 149° C. were observed in various trials under different conditions of application and proportions of reaction product to the glass fibers.

The improvements obtained by the practice of the present invention relative to higher yield of deposited resin on mineral fibers are of definite economic importance. This can be demonstrated by reference to the water-soluble phenol-formaldehyde condensation products described in the Meharg, U. S. Patent No. 2,190,672 that are based on reacting a molar amount of a phenol with not more than 1.75 mols formaldehyde and in the instance of phenol per se preferably not more than one mol thereof to 1.50 mols of formaldehyde. A water-soluble phenol-formaldehyde condensation product made with the maximum of 1.50 mols reacted formaldehyde according to the Meharg teachings was tested to ascertain the amount of cured resin remaining on the glass fibers when subjected to curing temperatures of 230°–290° C. as previously described. The Meharg water-soluble resin on the basis of the resins solids obtained by heating a sample for two hours at 149° C. had only 45 percent of such solids retained on the glass fibers, the remainder having been volatilized under the much higher curing temperatures of the bonding operation.

Example 2

A reaction mixture of phenol, formaldehyde and catalyst identical to Example 1 was vacuum refluxed for 2.00 hours instead of 1.25 hours at 70° C. Vacuum distillation and partial neutralization were performed as in Example 1. The resultant product exhibited a water-miscibility of 1100 percent and when purified an average molecular weight of 255. Analytical data based on the charged molar ratio of one mol phenol and 3.329 mols formaldehyde indicated that 2.630 mols formaldehyde had reacted to form methylol and methylene groups. 79 percent of the potential resin solids at 149° C. were recovered when baked on glass fibers at 230° C. as compared with the 71 percent value of Example 1. The effect of increased reaction time on amount of reacted formaldehyde, and, consequently on resin solids recovery in high temperature curing applications is demonstrated by this example.

Example 3

A still as described in Example 1 was charged (all parts being by weight) with 100 parts of synthetic phenol, 287 parts formalin (37 percent formaldehyde content) and 10 parts of solid sodium hydroxide. Heat was applied as in Example 1 and the reaction conducted at 70° C. for 1.25 hours. 15 parts boric acid in 38 parts of water were then added and 1.3 parts sodium hydroxide to secure a pH between 7.3 and 7.8. The resultant product was an amber colored liquid having a viscosity of 18–20 centistokes at 25° C.; a water-miscibility of 1500 percent; and a specific gravity of 1.1700–1.1750 at 25° C. The non-volatile or solids content was 39.6 percent as determined by drying a sample for two hours at 149° C., as previously described. Analytical data, based on the charged molar ratio of one mol phenol and 3.329 mols formaldehyde indicated that 2.923 mols of formaldehyde had reacted to form methylol and methylene groups. 84 percent of the potential resin solids as determined at 149° C. were recovered by baking on glass fibers as compared to 79 percent in Example 2 and 71 percent in Example 1. The effect of increased catalyst concentration on the amount of formaldehyde reacted and on the amount of resin solids recoverable at 230–290° C. heat-converting conditions is demonstrated by this example.

This material at a 25° C. storage temperature dropped in miscibility with distilled water from an original value of 1100 percent to 500 percent in forty days as compared with ten days for Example 2.

Example 4

A reaction vessel fitted with cooling coils was charged with 1 mol of phenol and 3.329 mols of formaldehyde as paraform, solid sodium hydroxide, 0.147 mol (6.25% based on phenol) was added and the mixture heated carefully to 40° C. Cooling coils were employed to control temperature rise to 60° C. at which temperature the reaction proceeded for 2.0 hours. The condensation reaction product was cooled to 30° C. and partially neutralized with hydrochloric acid to a pH range of 7.3–7.8. The neutralized product exhibited a water-miscibility of 2000 percent. The condensation reaction product was similar in all respects to that obtained in Example 1 and exhibited the same percentage amount of heat-converted resin solids (71 percent) when baked on to glass fibers at high curing temperatures. This example illustrates that paraform is substantially equivalent to formalin as a source of formaldehyde.

The water-soluble, phenol-formaldehyde, reaction products of the present invention can be used as the sole binder for mineral fibers as shown by the several examples. On the other hand, when desired they can be admixed or extended with other resins as heretofore proposed for this type of phenolic product in connection with the bonding of mineral fibers. Acidic natural resins available at comparatively low prices, such as rosin and derivatives thereof, particularly that sold under the trademark name "Vinsol" are useful as extenders, particularly when they are incorporated in emulsified form.

"Vinsol" is the trade name for the rosin-like material remaining after the distillation of rosin from pine stumps, and is marketed by the Hercules Powder Company. It is both phenolic and acidic in its chemical behavior and is highly water insoluble. It is usually applied in the form of an aqueous emulsion or suspension, in admixture with the water diluted phenol-formaldehyde condensation product to the mineral fibres and eventually becomes a part of the hardened (insoluble and infusible) binder. The "Vinsol" may constitute from 0 to about 60 percent of the total resin binder solids, however its use tends to diminish the high fiber bond strength imparted by the phenolic condensation product.

What is claimed is:

1. Process for preparing a highly water-soluble phenol-formaldehyde condensate characterized by a high yield of resin solids on heat-curing which comprises reacting at a pH between 8.4 and 11.5 in the presence of a non-volatile inorganic alkaline catalyst, a mol of phenol and at least 2.5 mols of formaldehyde at a reaction temperature not in excess of about 80° C. until a water-soluble condensation product is obtained having a water miscibility of at least 500 per cent, at least 2.25 mols of formaldehyde reacted per mol of phenol and an average molecular weight between 225 and 300, and partially neutralizing the condensation product by a water-soluble acid in amount imparting to the product a pH value between 7.3 and 7.8.

2. Process for preparing a highly water-soluble phenol-formaldehyde condensate characterized by a high yield of resin solids on heat-curing which comprises reacting at a pH between 8.4 and 11.5 and in the presence of an inorganic alkaline catalyst a reaction mixture of a mol of phenol and at least 2.5 mols of formaldehyde at a reaction temperature not in excess of about 80° C. until a water-soluble condensation product is obtained having at least 2.25 mols of formaldehyde reacted per mol of phenol and an average molecular weight between 225 and 300, partially dehydrating the condensation product while maintaining the product at a pH value of at least 8.4 and a water-miscibility of at least 500 percent and then partially neutralizing the alkaline catalyst in the dehydrated condensate with a water-soluble acid in an amount imparting a pH value between 7.3 and 7.8 to the condensate.

3. Process for preparing a highly water-soluble phenol-formaldehyde condensate characterized by a high yield of resin solids on heat-curing which comprises reacting at a reaction temperature not in excess of about 80° C. a mol of phenol and at least 2.5 mols formaldehyde at a pH value between 8.4 and 11.5 in the presence 3 to 42.5 parts of sodium hydroxide as a catalyst until a water-soluble condensation product is formed having a water miscibility of at least 500 per cent, at least 2.25 mols of formaldehyde reacted per mol of phenol and an average molecular weight between 225 and 300 and partially neutralizing said product with a water-soluble acid in amount imparting to the product a pH value between 7.3 and 7.8.

4. Process for preparing a highly water-soluble phenol-formaldehyde condensate characterized by a high yield of resin solids on heat-curing which comprises reacting at a reaction temperature not in excess of about 80° C. a mol of phenol and at least 2.5 mols of formaldehyde at a pH value between 8.4 and 11.5 in the presence of an inorganic catalyst selected from the group consisting of sodium hydroxide, potassium hydroxide, barium hydroxide and calcium hydroxide in an amount chemically equivalent to between 3 and 42.5 parts of sodium hydroxide per 100 parts by weight of phenol, until a water-soluble condensation product is formed having a water miscibility of at least 500 per cent, an average molecular weight between 225 and 300 and partially neutralizing said product with a water-soluble acid in amount imparting to the product a pH value between 7.3 and 7.8.

References Cited in the file of this patent

UNITED STATES PATENTS

| | | |
|---|---|---|
| 2,321,766 | Murdock | June 15, 1943 |
| 2,321,783 | Webber | June 15, 1943 |
| 2,360,376 | Van Epps | Oct. 17, 1944 |
| 2,513,614 | Barkhuff | July 4, 1950 |
| 2,608,536 | Sterling | Aug. 26, 1952 |
| 2,609,352 | Kvalnes | Sept. 2, 1952 |

FOREIGN PATENTS

| | | |
|---|---|---|
| 629,467 | Great Britain | Sept. 21, 1949 |
| 885,758 | France | June 7, 1943 |

OTHER REFERENCES

Robitschek: Phenolic Resins, pages 110–114, Iliffe and Sons, Ltd., London (1950).